(12) United States Patent
Kawamura et al.

(10) Patent No.: US 7,466,216 B2
(45) Date of Patent: Dec. 16, 2008

(54) SECURITY CONTROL SYSTEM

(75) Inventors: Daisuke Kawamura, Aichi (JP); Akihito Kimura, Aichi (JP); Keiji Yamamoto, Okazaki (JP); Koichi Masamura, Toyota (JP); Takao Ozawa, Toyota (JP); Yoshihide Nakane, Okazaki (JP)

(73) Assignees: Kabushiki Kaisha Tokai Rika Denki Seisakusho, Aichi (JP); Toyota Jidosha Kabushiki Kaisha, Aichi-ken (JP)

( * ) Notice: Subject to any disclaimer, the term of this patent is extended or adjusted under 35 U.S.C. 154(b) by 584 days.

(21) Appl. No.: 11/059,057

(22) Filed: Feb. 16, 2005

(65) Prior Publication Data

US 2005/0179519 A1 Aug. 18, 2005

(30) Foreign Application Priority Data

Feb. 16, 2004 (JP) ............................ 2004-038023

(51) Int. Cl.
*H04Q 9/00* (2006.01)
(52) U.S. Cl. .................. 340/5.23; 340/5.72; 340/426.1; 340/426.18; 340/426.2; 340/5.3; 340/5.33; 340/539.1; 340/5.5; 340/5.61
(58) Field of Classification Search .............. 340/5.23, 340/5.72, 426.1, 426.18, 426.2, 5.3, 5.33, 340/539.1, 5.5, 5.61, 5.64, 825.31, 825.3
See application file for complete search history.

(56) References Cited

U.S. PATENT DOCUMENTS 5,686,765 A * 11/1997 Washington ............... 307/10.5
6,091,340 A * 7/2000 Lee et al. ..................... 340/5.6
6,329,901 B2 * 12/2001 Brinkmeyer et al. .......... 340/5.4
6,333,703 B1 * 12/2001 Alewine et al. ......... 340/995.13
6,842,105 B1 * 1/2005 Henderson et al. .......... 340/5.73
6,900,723 B2 * 5/2005 Yamanaka et al. ....... 340/426.1
2003/0206102 A1 11/2003 Joao

FOREIGN PATENT DOCUMENTS

| DE | 198 12 210 C1 | 5/1999 |
|---|---|---|
| EP | 1 059 212 A1 | 12/2000 |
| EP | 1 394 006 A1 | 3/2004 |
| EP | 1 568 834 A1 | 8/2005 |
| JP | 7-264315 A | 10/1995 |
| JP | 8-307955 A | 11/1996 |
| JP | 2000-339592 A | 12/2000 |
| JP | 2001-289142 A | 10/2001 |
| JP | 2001-311333 A | 11/2001 |

\* cited by examiner

*Primary Examiner*—Brian A Zimmerman
*Assistant Examiner*—Nabil H Syed
(74) *Attorney, Agent, or Firm*—Crompton, Seager & Tufte, LLC

(57) ABSTRACT

A control system for improving the security level of a security device. A portable device is provided with a communication function and has a portable device ID code. A security controller includes a memory for recording a controller ID code. The security controller communicates with the portable device to determine whether the portable device ID code matches the controller ID code, and controls deactivation of security functions for a door lock driver and an engine controller based on the determination result. In response to a restriction request signal, the management apparatus transmits a function restriction signal to the security controller. The security controller prohibits or restricts control of the door lock driver or the engine controller when receiving the function restriction signal and communicating with the portable device.

15 Claims, 4 Drawing Sheets

SECURITY CONTROL SYSTEM

BACKGROUND OF THE INVENTION

The present invention relates to a security control system, a security controller, a management apparatus for a security control system, and a security control method used in, for example, vehicles or houses.

Typically, security equipment such as door locks for vehicles or houses is operated by a user using an exclusive mechanical key. Using such security equipment, however, there is a risk of the mechanical key being fraudulently copied or the lock being picked. This would result in unauthorized operation of the security equipment.

In the prior art, a security control system employing electronic verification for enhancing the security level of security equipment has been proposed.

Japanese Laid-Open Patent Publication Nos. 2001-289142 and 2001-311333 describe examples of a vehicle security control system designed to perform radio communication between a portable device carried by a user and a security controller installed in a vehicle. Specifically, the portable device transmits to the security controller an ID code signal containing a unique ID code assigned to the portable device. Upon receipt of the ID code signal, the security controller compares the ID code contained in the ID code signal with an ID code registered beforehand in the security controller. If the two ID codes match, the security controller unlocks the door or enables the engine to be started. In other words, the security controller is designed to deactivate the security of security equipment on the condition that the ID code of the portable device matches with the ID code registered in the security controller. Therefore, a third party who does not have the portable device corresponding to the vehicle will not be able to deactivate the security. This enhances the security level of the security equipment.

The security controllers for vehicles in the prior art exhibit a superior anti-theft effect as long as they are used in ordinary circumstances. However, the user may lose the portable device. Further, the portable device may be stolen. In such a case, a third party may use the portable device. Thus, the vehicle security control system of the prior art cannot always provide sufficient anti-theft effect in such special cases.

SUMMARY OF THE INVENTION

It is an object of the present invention to provide a security control system, a security controller, a management apparatus for a security control system, and a security control method for further improving the security level of security equipment.

One aspect of the present invention is a system for controlling a security device provided with a security function. The system includes a portable device provided with a communication function and having a portable device ID code. A security controller includes a recording unit for recording a controller ID. The security controller communicates with the portable device to determine whether the portable device ID code and the controller ID code match, and controls deactivation of the security function of the security device based on the determination result. A management apparatus transmits a function restriction signal to at least one of the portable device and the security controller in response to a restriction request signal. The security controller prohibits or restricts control of the security device when receiving the function restriction signal or when communicating with the portable device that has received the function restriction signal.

Another aspect of the present invention is a security controller for use with a portable device, having a portable device ID code, and a management apparatus, for transmitting a function restriction signal. The security controller controls a security device provided with a security function. The security controller includes a portable device communication unit for communicating with the portable device. A recording unit records a controller ID code corresponding to the portable device ID code. A control unit determines whether the portable device ID code matches the controller ID code and controls the security device based on a determination result. A security communication unit communicates with the management apparatus. The control unit prohibits or restricts deactivation of the security function of the security device when the security communication unit receives the function restriction signal.

A further aspect of the present invention is a management apparatus for use with a portable device, having a portable device ID code, and a security controller, having a controller ID code. The security controller communicates with the portable device to determine whether the portable device ID code and the controller ID code match, and controls deactivation of the security function of a security device based on the determination result. The management apparatus includes at least one of a management communication unit and a portable device communication unit. The management communication unit communicates with the security controller, and the portable device communication unit communicates with the portable device. A management control unit transmits a function restriction signal when receiving a restriction request signal to at least one of the security controller and the portable device via the at least one of the management communication unit and the portable device communication unit. The function restriction signal prohibits or restricts deactivation of a security function of a security device.

Another aspect of the present invention is a security control method for use with a portable device, having a portable device ID code, a security controller, having a controller ID code, and a management apparatus, for communicating with the security controller. The security controller determines whether the portable device ID code matches the controller ID code and controls deactivation of a security function of a security device based on the determination result. The method includes transmitting a restriction request signal for function restriction to the management apparatus, transmitting a function restriction signal with the management apparatus to at least one of the portable device and the security controller in response to the restriction request signal, and prohibiting or restricting deactivation of the security function of the security device when the security device receives the function restriction signal or when communicating with the portable device that has received the function restriction signal.

Other aspects and advantages of the present invention will become apparent from the following description, taken in conjunction with the accompanying drawings, illustrating by way of example the principles of the invention.

BRIEF DESCRIPTION OF THE DRAWINGS

The invention, together with objects and advantages thereof, may best be understood by reference to the following description of the presently preferred embodiments together with the accompanying drawings in which.

DETAILED DESCRIPTION OF THE PREFERRED EMBODIMENTS

A vehicle security control system 1 according to a preferred embodiment of the present invention will now be described with reference to FIGS. 1 to 4.

Figure 1:
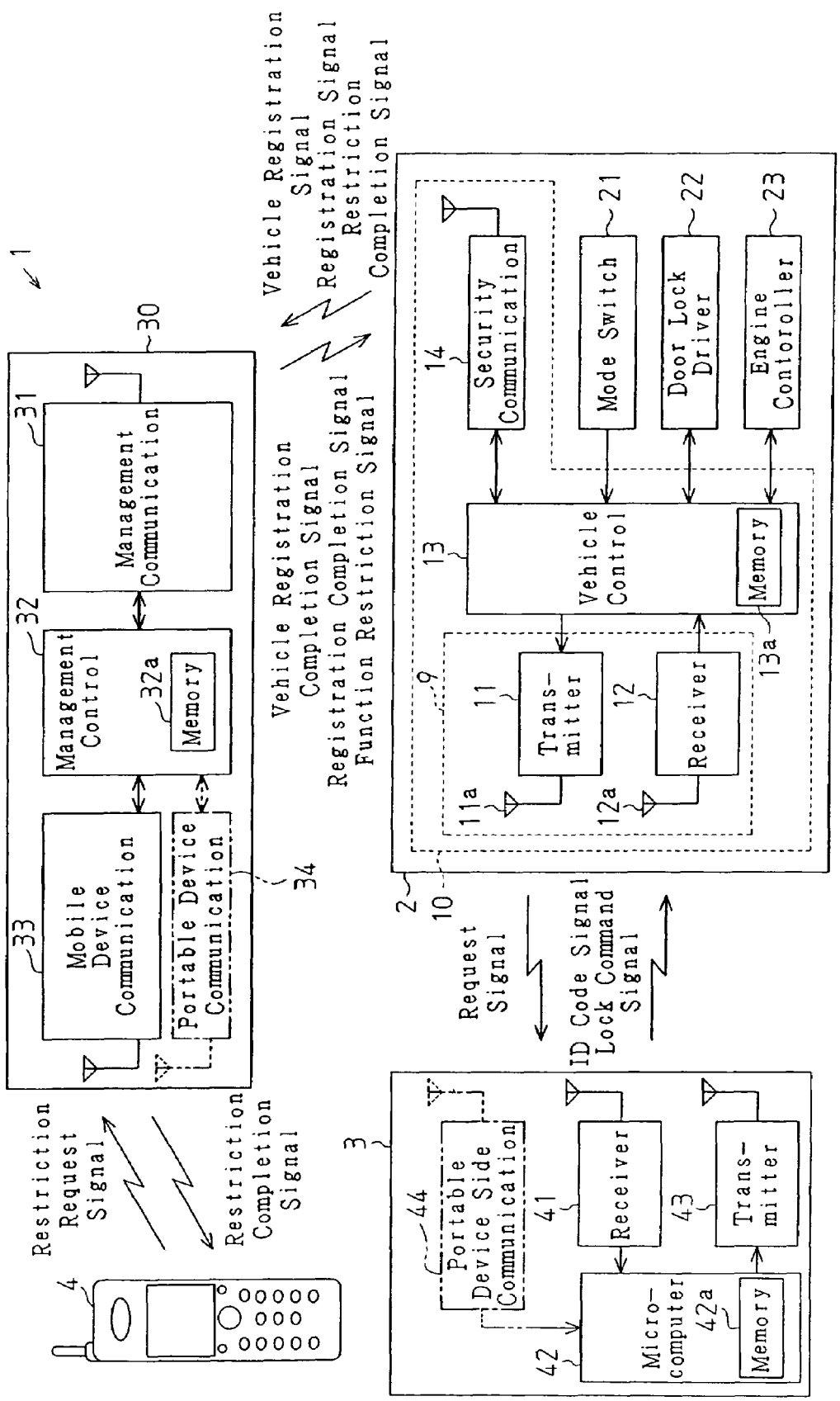
FIG. 1 is a schematic block diagram of a vehicle security control system according to a preferred embodiment of the present invention.

As shown in FIG. 1, the vehicle security control system 1 includes a portable device 3 carried by a user (owner) of a vehicle 2, a security controller 10 installed in the vehicle 2, and a management apparatus 30 arranged outside of (separately from) the vehicle 2.

The portable device 3, which is provided with a communication function, records a predetermined ID code. The security controller 10 transmits a request signal. The portable device 3 includes a receiver circuit 41 for receiving the request signal from the security controller 10, a microcomputer 42 for receiving the request signal from the receiver circuit 41, and a transmitter circuit 43 for transmitting an ID code signal and a lock command signal provided from the microcomputer 42.

The receiver circuit 41 demodulates the received request signal to a pulse signal and provides the pulse signal to microcomputer 42. The transmitter circuit 43 modulates the ID code signal and the lock command signal provided from the microcomputer 42 to radio waves having predetermined frequencies and transmits the radio waves.

The microcomputer 42 includes a CPU, a ROM, a RAM (none of which are shown), and a non-volatile memory 42a. The memory 42a records a predetermined ID code for each portable device.

The microcomputer 42 reads the ID code from the memory 42a when receiving a request signal from the receiver circuit 41 and transmits an ID code signal, which contains the ID code, to the transmitter circuit 43. The microcomputer 42 is electrically connected to an operation portion (not shown), which is located on an ornamental surface of the portable device 3. When the operation portion is operated, an operation signal is provided to the microcomputer 42. The microcomputer 42 then provides the transmitter circuit 43 with a lock command signal, which includes the ID code and a lock code or an unlock code.

The security controller 10 has a transmitter circuit 11, a receiver circuit 12, a vehicle control unit 13, and a security communication unit 14. The transmitter circuit 11 and the receiver circuit 12 form a portable device communication unit 9. The transmitter circuit 11, the receiver circuit 12, and the security communication unit 14 are electrically connected to the vehicle control unit 13.

The vehicle control unit 13 provides a request signal to the transmitter circuit 11. The transmitter circuit 11 converts the request signal to radio waves of a predetermined frequency (134 kHz in this embodiment). Then, the transmitter circuit 11 transmits the radio waves, via a transmitter antenna 11a, selectively to a predetermined area around the vehicle 2 and to the passenger compartment of the vehicle 2.

The receiver circuit 12 receives the ID code signal and the lock command signal transmitted by the portable device 3 via a receiver antenna 12a. Then, the receiver circuit 12 demodulates the received signal to a pulse signal before providing the signal to the vehicle control unit 13.

The security communication unit 14 is designed to be able to communicate with a management apparatus 30 which transmits a transmission signal. The vehicle control unit 13 provides a registration signal to the security communication unit 14. The security communication unit 14 modulates the registration signal to radio waves with a predetermined frequency, and transmits the radio waves to the management apparatus 30. When receiving a transmission signal from the management apparatus 30, the security communication unit 14 demodulates the transmission signal to a pulse signal before providing the demodulated signal to the vehicle control unit 13.

The vehicle control unit 13 has a CPU, a ROM, a RAM (none of which are shown), and a nonvolatile memory 13a, which functions as a recording unit. The memory 13a records one or more ID codes assigned to the portable device 3.

The vehicle control unit 13 is electrically connected to a mode switch 21, a door lock driver 22, and an engine controller 23. The door lock driver 22 and the engine controller 23 function as a security device.

The mode switch 21 is located in the passenger compartment of the vehicle 2 and operated by a user. When operated by the user, the mode switch 21 provides an operation signal to the vehicle control unit 13.

The door lock driver 22 is connected to an actuator (not shown). The vehicle control unit 13 provides a drive signal to the door lock driver 22. In response to the drive signal, the door lock driver 22 drives the actuator to lock or unlock a door. The door lock driver 22 provides, to the vehicle control unit 13, a lock signal indicating whether the door is locked or unlocked. The vehicle control unit 13 recognizes whether the door is locked or unlocked based on the lock signal.

The engine controller 23 is connected to a starter motor (not shown). The vehicle control unit 13 provides a start signal to the engine controller 23. In response to the start signal, the engine controller 23 drives the starter motor and, at the same time, performs fuel injection control and ignition control to start the engine. The engine controller 23 provides to the vehicle control unit 13 a drive state signal indicating the drive state of the engine. The vehicle control unit 13 recognizes the drive state of the engine based on the drive state signal.

The vehicle control unit 13 operates in a vehicle registration mode, an ID registration mode, and a security control mode. The vehicle registration mode refers to a mode for performing vehicle registration control in which the vehicle 2 is registered as the management subject of the management apparatus 30. The ID registration mode refers to a mode for performing ID registration control for recording (registering) the ID code of the portable device 3 in the memory 13a. The security control mode refers to a mode for controlling the door lock driver 22 and the engine controller 23 through communication with the portable device 3 of which the ID has been registered. When receiving an operation signal from the mode switch 21, the vehicle control unit 13 enters the ID registration mode or the vehicle registration mode. Otherwise, the vehicle control unit 13 is set in the security control mode. That is, the vehicle control unit 13 is normally set in the security control mode but is switched to the ID registration mode or the vehicle registration mode when the mode switch is operated. Alternatively, the vehicle control unit 13 may be switched to the ID registration mode by operating the mode switch 21 and be switched to the vehicle registration mode when another switch is operated. That is, the vehicle control unit 13 may be configured to be switched to the ID registration mode or the vehicle registration mode by performing a certain operation.

The vehicle control unit 13 performs vehicle registration control when entering the vehicle registration mode.

More specifically, the vehicle control unit 13 receives an input signal from an input device (not shown), such as an input unit of a car navigation system. After entering the vehicle registration mode, the user inputs a function restriction code number with an input device. Then, an input signal containing the function restriction code number is provided to the vehicle control unit 13. As a result, the vehicle control unit 13 transmits to the management apparatus 30 via the security communication unit 14 a vehicle registration signal containing vehicle information and the function restriction code. The vehicle information code is information for identifying the vehicle 2. In this embodiment, the vehicle information includes at least one of the chassis number of the vehicle 2, the vehicle number, and dealer information (e.g., the store identification number or password uniquely assigned to the dealer). The function control restriction code is obtained by binary-converting a function restriction code number.

When receiving a vehicle registration completion signal from the management apparatus 30 via the security communication unit 14, the vehicle control unit 13 displays a message indicating completion of registration of the vehicle 2 on an indicator (not shown) arranged in the passenger compartment of the vehicle 2.

When entering the ID registration mode, the vehicle control unit 13 performs registration communication control.

More specifically, the vehicle control unit 13 intermittently provides the transmitter circuit 11 with the request signal. The transmitter circuit 11 transmits the request signal to the passenger compartment of the vehicle 2 via the transmitter circuit 11 and the transmitter antenna 11a. In response to the request signal, the portable device 3 transmits an ID code signal that is received by the receiver circuit 12 via the receiver antenna 12a. When receiving the ID code signal from the receiver circuit 12, the vehicle control unit 13 records the ID code that is contained in the ID code signal in the memory 13a. When the recording of the ID code is completed, the vehicle control unit 13 provides the security communication unit 14 with a registration signal containing the ID code and vehicle information. The security communication unit 14 transmits the registration signal to the management apparatus 30.

In the security control mode, the vehicle control unit 13 intermittently provides a request signal to the transmitter circuit 11. The transmitter circuit 11 transmits the request signal, via the transmitter antenna 11a, selectively to a predetermined area around the vehicle 2 or to the passenger compartment of the vehicle 2. When receiving the ID code signal or the lock command signal from the receiver circuit 12, the vehicle control unit 13 compares the ID code contained in the received signal with the ID code recorded in the memory 13a (ID code authentication). If the two ID codes match or if the authentication of the ID code is established, the vehicle control unit 13 drives the door lock driver 22 or the engine controller 23.

More specifically, when receiving an ID code signal in response to a request signal transmitted to the predetermined area around the vehicle 2, the vehicle control unit 13 provides a drive signal to the door lock driver 22 to unlock the door. When the ID code signal is no longer provided to the vehicle control unit 13, the vehicle control unit 13 provides a drive signal to the door lock driver 22 to lock the door.

When receiving an ID code signal in response to a request signal transmitted to the passenger compartment of the vehicle 2, the vehicle control unit 13 is set to an engine start stand-by state. A start switch (not shown) is arranged in the vicinity of the driver's seat in the passenger compartment of the vehicle 2 and is electrically connected to the vehicle control unit 13. When the vehicle control unit 13 receives an operation signal from the start switch in the engine start stand-by state, the vehicle control unit 13 provides a start signal to the engine controller 23 to start the engine. This means that when the vehicle control unit 13 is not in the engine start stand-by state, the vehicle control unit 13 will not provide a start signal to the engine controller 23 even if receiving an operation signal from the start switch.

When receiving a lock command signal containing a lock code, the vehicle control unit 13 locks the door. When receiving a lock command signal containing an unlock code, the vehicle control unit 13 unlocks the door.

In this manner, when in the security control mode, the security controller 10 controls the security of the door lock driver 22 and the engine controller 23 based on whether the authentication of the ID code involving the use of the portable device 3 has been established or not.

The management apparatus 30 is arranged in, for example, an exclusive management center and includes a management communication unit 31, a management control unit 32, and a mobile device communication unit 33. The management control unit 32 is electrically connected to the management communication unit 31 and the mobile device communication unit 33.

The management communication unit 31 communicates with the security communication unit 14 in the security controller 10. When receiving a registration signal from the security communication unit 14, the management communication unit 31 demodulates the registration signal and provides the demodulated signal to the management control unit 32.

The mobile device communication unit 33 communicates with a mobile device (cellular phone 4) held by the user.

The cellular phone 4 determines that a restriction operation has been performed when the function restriction code number is input with the numeric keys of the cellular phone 4. Then, the cellular phone 4 transmits to the management apparatus 30 a restriction request signal including a function restriction code generated by binary-converting the function restriction code number. When a portable device designation number designating the portable device 3 is input with the numeric keys in addition to the function restriction code number, the cellular phone 4 transmits to the management apparatus 30 a restriction request signal containing the function restriction code and a portable device designation code. The portable device designation number indicates the registration number of ID codes recorded in the memory 32a of the management apparatus 30. The portable device designation code is generated by binary-converting the portable device designation number.

When receiving a restriction request signal from the cellular phone 4, the mobile device communication unit 33 demodulates the restriction request signal and provides the demodulated signal to the management control unit 32. When receiving a restriction completion signal from the management control unit 32, the mobile device communication unit 33 transmits the restriction completion signal to the cellular phone 4 through a public communication network. When receiving the restriction completion signal from the mobile device communication unit 33, the cellular phone 4 informs the receipt of the restriction completion signal by means of noise, vibrations, or a message display.

The management control unit 32 is a computer unit including a CPU, a ROM, and a RAM (none of which are shown), and a non-volatile memory 32a.

The memory 32a records vehicle information of the vehicle 2 set as the management subject. More specifically, the memory 32a records the vehicle information including the chassis number, the vehicle number, the dealer information (e.g. the store identification number or password uniquely assigned to the dealer) of the vehicle 2, device information of the cellular phone 4 (e.g., telephone number and e-mail address), and other information for identifying the vehicle 2.

The memory 32a records the function restriction code transmitted from the security controller 10 during vehicle registration and the ID code transmitted from the security controller 10 during registration communication control in a state respectively associated with the vehicle information. More specifically, a recording region for the function restriction code and a recording region for the ID code (ID recording region) are set in association with the vehicle information in the memory 32a. For example, when vehicle information A and B for two vehicles are recorded in the memory 32a, the function restriction code recording region and ID recording region associated with vehicle information A are set separately from the function restriction code recording region and ID recording region associated with vehicle information B. A plurality of ID codes are recordable in the ID recording regions. The number of recordable ID codes in the recording region is preset or set by the user. Further, for example, registration numbers are added to the ID codes recorded in the recording region in accordance with the recording order.

When receiving a vehicle registration signal from the management communication unit 31, the management control unit 32 records the vehicle information and the function restriction code, which are contained in the vehicle registration signal, in a state associated with each other in the memory 32a. The management control unit 32 transmits the vehicle registration completion signal, which indicates completion of the vehicle registration, to the security controller 10 via the management communication unit 31.

When receiving the registration signal from the management communication unit 31, the management control unit 32 records the ID code included in the registration signal in the ID recording region associated with the vehicle information contained in the registration signal. The management control unit 32 transmits to the security controller 10 via the management communication unit 31 a registration completion signal indicating completion of recording.

Further, when receiving the restriction request signal from the mobile device communication unit 33, the management control unit 32 determines whether there is a function restriction code in the memory 32a that is corresponding to the function restriction code contained in the restriction request signal (code presence determination). When the memory 32a includes the function restriction code contained in the restriction request signal, the management control unit 32 specifies the vehicle that is the management subject of the restriction command control based on the vehicle information associated with the function restriction code. The management control unit 32 transmits the function restriction signal containing the function restriction code via the management communication unit 31 to the security controller 10 installed in the specified vehicle 2. When the restriction request signal further includes the portable device designation code, the management control unit 32 reads the ID code associated with the registration number corresponding to the portable device designation code. The management control unit 32 transmits a function restriction signal containing the read ID code and the function restriction code via the management communication unit 31. When receiving the restriction completion signal from the management communication unit 31, the management control unit 32 transmits a restriction completion signal to the cellular phone 4 via the mobile device communication unit 33.

When receiving a function restriction signal from the management apparatus 30, the security controller 10 restricts or prohibits the driving of the door lock driver 22 or the engine controller 23 based on communication with the portable device 3 (function restriction processing).

More specifically, the security communication unit 14 of the security controller 10 receives a function restriction signal. The function restriction signal is then provided to the vehicle control unit 13. When receiving the function restriction signal, the vehicle control unit 13 transmits the restriction completion signal, which indicates that the setting for function restriction has been completed, to the management apparatus 30 via the security communication unit 14. Further, the vehicle control unit 13 determines whether or not an ID code is contained in the function restriction signal. If it is determined that no ID code is contained in the function restriction signal, the vehicle control unit 13 restricts or prohibits the control of the door lock driver 22 or the engine controller 23 even if the ID code of the portable device 3, which is able to communicate, is authenticated. In other words, the vehicle control unit 13 restricts or prohibits deactivation of security devices (the door lock driver 22 or the engine controller 23) even if the ID code of the portable device 3 corresponding to the ID code recorded in the memory 13a is authenticated. If the function restriction signal contains an ID code, the vehicle control unit 13 restricts or prohibits the control of the door lock driver 22 or the engine controller 23 only when the ID code of the portable device 3, which corresponds to the ID code contained in the function restriction signal, is authenticated.

In this embodiment, the vehicle control unit 13 implements the function restriction processing as described in the following (a) or (b). The user is allowed to select the processing that is to be performed.

(a) First Function Restriction Processing (Security Deactivation Prohibiting Processing)

(a-1) When the Function Restriction Signal Contains No ID Code

When receiving an ID code signal or lock command signal transmitted by a portable device 3 in response to a request signal, the vehicle control unit 13 does not drive the door lock driver 22 or the engine controller 23 even if the ID code contained in the ID code signal or the lock command signal is recorded in the memory 13a. That is, the vehicle control unit 13 prohibits the unlocking of the door or the startup of the engine even if the ID code of the portable device is authenticated. In other words, when receiving a function restriction signal, the vehicle control unit 13 prohibits the security deactivation operations, such as unlocking the door with the door lock driver 22 or enabling the starting of the engine with the engine controller 23.

(a-2) When the Function Restriction Signal Contains an ID Code

When receiving an ID code signal or lock command signal transmitted by a portable device 3 in response to a request signal, the vehicle control unit 13 first compares the ID code contained in the ID code signal or the lock command signal with the ID code contained in the function restriction signal. The vehicle control unit 13 does not drive the door lock driver 22 or the engine controller 23 when these two ID codes match. In other words, the vehicle control unit 13 prohibits security deactivation operations, such as unlocking the door or starting the engine, when the ID code of the portable device 3 matches the ID code contained in the function restriction signal. Accordingly, the vehicle control unit 13 performs a security deactivation operation when receiving an ID code signal or lock command signal containing an ID code not contained in the function restriction signal but recorded in the memory 13a. In other words, the attempt to deactivate security with a specific portable device 3 is prevented.

(b) Second Function Restriction Processing (Security Deactivation Restriction Processing) (b-1) When the Function Restriction Signal Contains No ID Code When receiving an ID code signal or a lock command signal transmitted by a portable device 3 in response to a request signal transmitted to the outside of the vehicle 2, the vehicle control unit 13 controls the door lock driver 22 to lock or unlock the door. However, when receiving an ID code signal transmitted by the portable device 3 in response to a request signal transmitted to the passenger compartment of the vehicle 2, the vehicle control unit 13 is not set to enable the starting of the engine. Therefore, even if the start switch is operated, the vehicle control unit 13 does not drive the engine controller 23. This means that when the ID code of the portable device 3 is authenticated, the vehicle control unit 13 locks or unlocks the door. However, the starting of the engine is prohibited. In other words, when receiving a function restriction signal, the vehicle control unit 13 restricts security deactivation operations.

(b-2) When the Function Restriction Signal Contains an ID Code

When receiving an ID code signal or lock command signal transmitted by a portable device 3 in response to a request signal transmitted to the outside of the vehicle 2, the vehicle control unit 13 also drives the door lock driver 22 to lock or unlock the door. That is, the vehicle control unit 13 locks or unlocks the door in the same manner as when the function restriction signal contains no ID code. However, if the vehicle control unit 13 receives, after receiving a function restriction signal containing an ID code, an ID code signal transmitted by the portable device 3 in response to a request signal transmitted to the passenger compartment of the vehicle 2, the vehicle control unit 13 first compares the ID code contained in the ID code signal with the ID code contained in the function restriction signal. The vehicle control unit 13 is not set to enable the starting of the engine when the ID code contained in the ID code signal matches the ID code contained in the function restriction signal. That is, if the ID code contained in the function restriction signal matches the ID code of the portable device 3, the vehicle control unit 13 locks or unlocks the door but prohibits the starting of the engine. In other words, when receiving a function restriction signal containing an ID code, the vehicle control unit 13 restricts security deactivation operations based on communication with the portable device 3 corresponding to the ID code contained in the function restriction signal. Accordingly, when receiving an ID code signal or lock command signal containing an ID code not contained in the function restriction signal but recorded in the memory 13a, the vehicle control unit 13 performs security deactivation operations as usual. This means that security deactivation operations are restricted only when using a specific portable device 3.

When receiving a restriction release signal indicating that the restriction control is to be released, the vehicle control unit 13 releases the function restriction control to switch the control mode to the normal security control mode. More specifically, the user inputs a restriction release number to the cellular phone 4. The cellular phone 4 transmits a restriction release signal that is in accordance with the restriction release number to the management apparatus 30. The management apparatus 30 transmits the restriction release signal to the security controller 10. When receiving the restriction release signal, the security controller 10 is switched to the normal security control mode.

In the vehicle security control system 1 of this embodiment, a communication mode implemented during vehicle registration control in which vehicle information of the vehicle 2 is registered in the management apparatus 30 so that the vehicle 2 is set as a subject that is to be managed by the management apparatus 30 will now be described with reference to FIG. 2.

Figure 2:
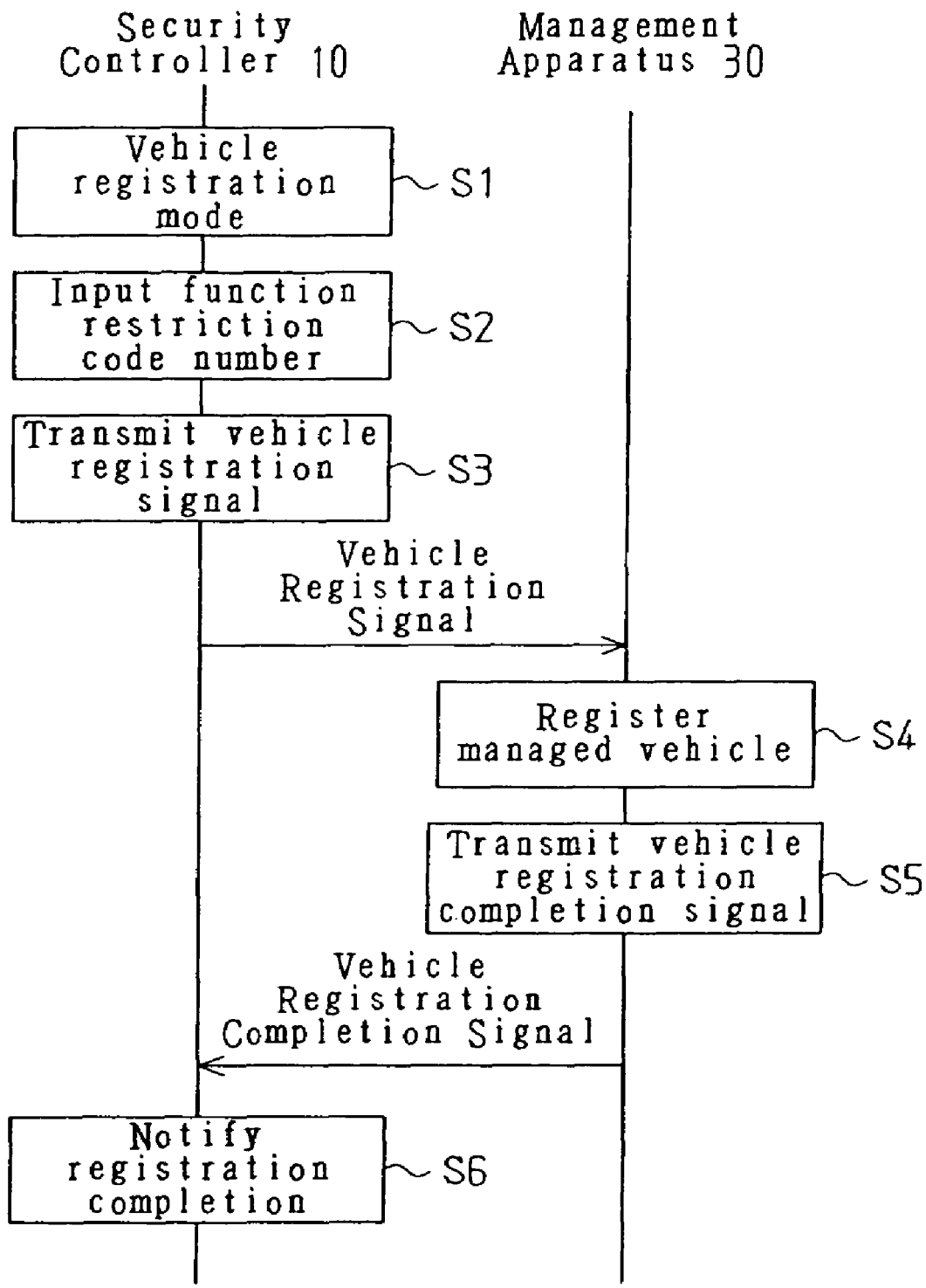
FIG. 2 is a sequence chart illustrating a communication mode when vehicle registration control is performed.

As shown in FIG. 2, registration of the vehicle 2 in the management apparatus 30 is performed by communication between the security controller 10 and the management apparatus 30.

More specifically, when a predetermined operation for shifting to the vehicle registration mode is performed with the mode switch 21, the security controller 10 is first switched to the vehicle registration mode (step S1). The security controller 10 receives a function restriction code number from the input device (step S2). The security controller 10 then transmits a vehicle registration signal containing vehicle information of the vehicle 2 and a function restriction security code to the management apparatus 30 (step S3).

When receiving the vehicle registration signal from the security controller 10, the management apparatus 30 records the vehicle information and the function restriction security code contained in the vehicle registration signal in the memory 32a, and thus completes the registration of the vehicle 2 as a management subject (managed vehicle registration) (step S4). Thus, the security controller 10 (vehicle 2) is registered as a management subject in the management apparatus 30. The management apparatus 30 transmits a vehicle registration completion signal indicating the completion of the vehicle registration to the security controller 10 (step S5).

When receiving the vehicle registration completion signal from the management apparatus 30, the security controller 10 has the indicator display a message indicating that the registration of the vehicle 2 has been completed (step S6). Thus, the user is able to confirm that the registration of the vehicle 2 has been completed by viewing the indicator.

A communication mode implemented by the vehicle security control system 1 to register an ID code for the portable device 3 in the security controller 10 will now be described with reference to the sequence chart shown in FIG. 3.

Figure 3:
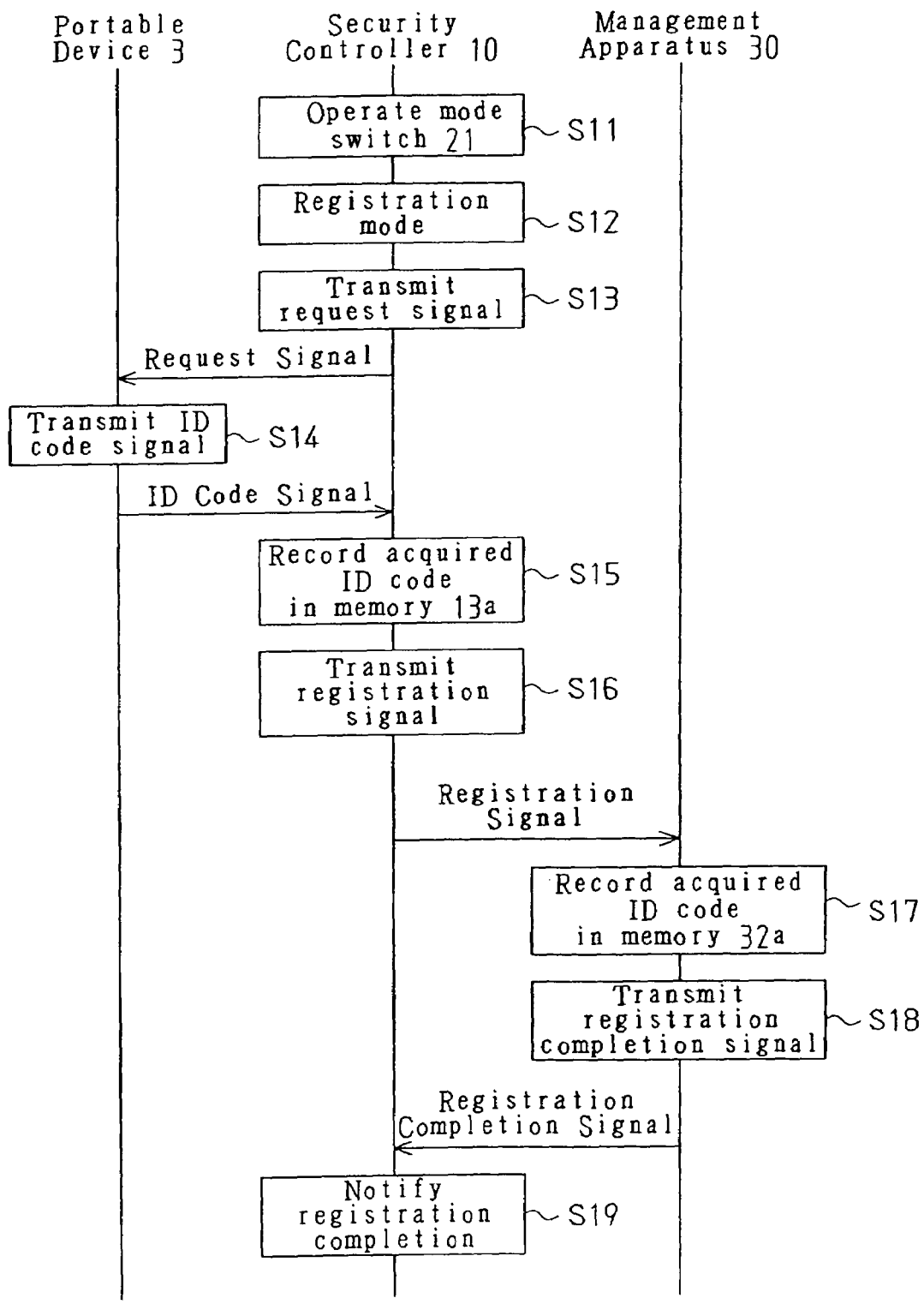
FIG. 3 is a sequence chart illustrating a communication mode when ID registration control is performed.

As shown in FIG. 3, ID registration is performed through communication between the portable device 3, the security controller 10, and the management apparatus 30.

First, the user operates the mode switch 21 of the security controller 10 (step S11). The security controller 10 is thereby switched from the security control mode to the ID registration mode (step S12). When switched to the ID registration mode, the security controller 10 transmits a request signal to the passenger compartment of the vehicle 2 (step S13).

When receiving the request signal, the portable device 3 transmits an ID code signal (step S14).

When receiving the ID code signal from the portable device 3, the security controller 10 records the ID code contained in the ID code signal in the memory 13a (step S15). That is, the security controller 10 registers the acquired ID code of the portable device 3. Subsequently, the security controller 10 transmits a registration signal to the portable device management apparatus 30 (step S16).

When receiving the registration signal from the security controller 10, the management apparatus 30 records the ID code contained in the registration signal in the memory 32a at the ID recording region associated with the vehicle information (step S17). Further, the management apparatus 30 transmits the registration completion signal to the security controller 10 (step S18). Accordingly, the management apparatus 30 manages the portable device 3 associated with the vehicle 2 based on the registered ID code.

When receiving a registration completion signal from the portable device management apparatus 30, the security controller 10, for example, has an indicator (not shown) provided in the passenger compartment of the vehicle 2 display a message indicating that the registration has been completed or has a speaker (not shown) generate an audible announcement indicating that the registration has been completed (step S19). In this manner, the user may confirm that the portable device 3 has been registered.

The communication mode during function restriction control, which prohibits or restricts security deactivation operations, in the vehicle security control system 1 will now be discussed with reference to the sequence chart of FIG. 4.

Figure 4:
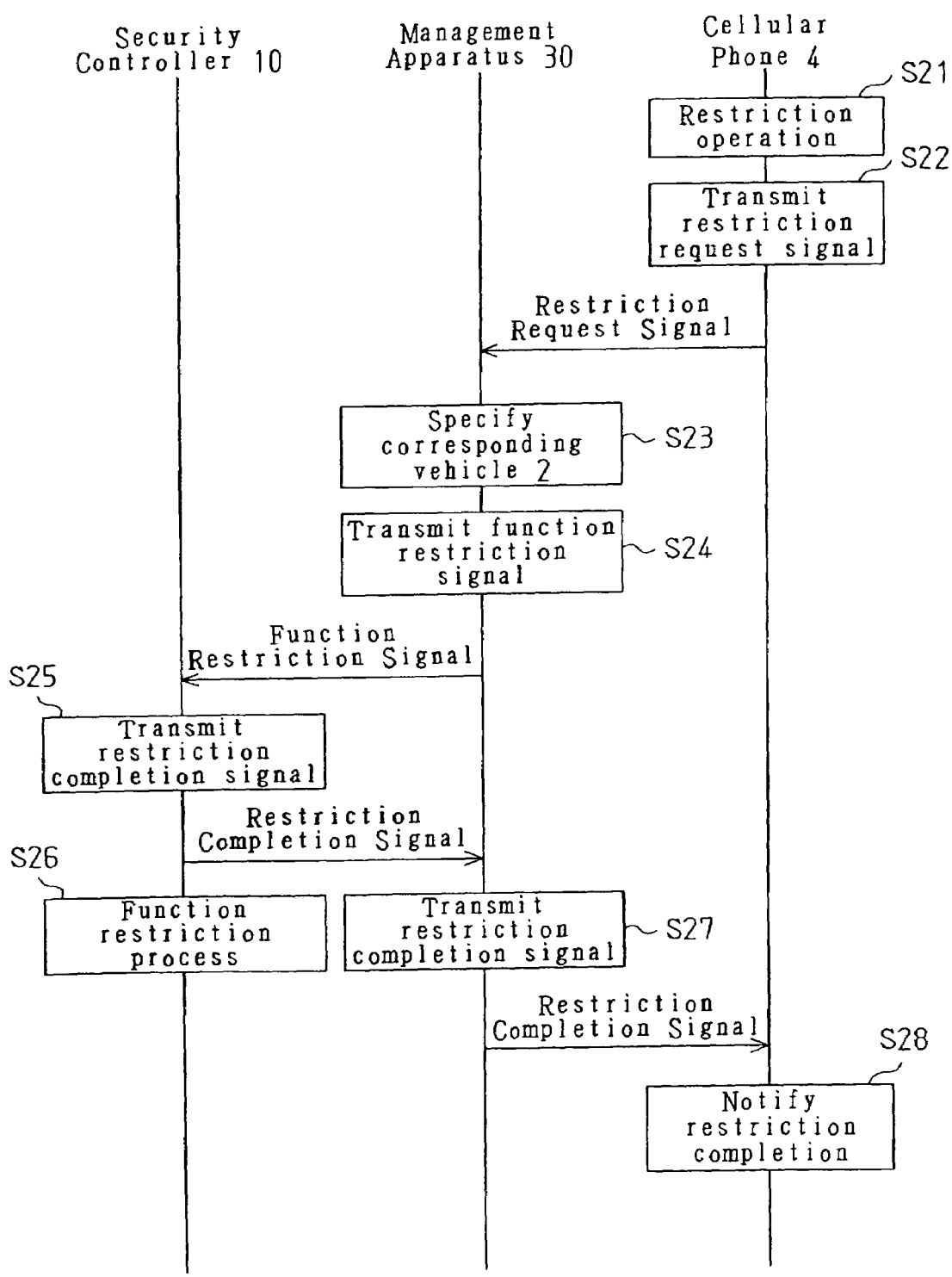
FIG. 4 is a sequence chart illustrating a communication mode when function restriction control is performed.

As shown in FIG. 4, the function restriction control is conducted by communication between the security controller 10, the management apparatus 30, and the cellular phone 4.

More specifically, a function restriction code number is input to the cellular phone 4 to perform a restriction operation (step S21). The cellular phone 4 then transmits a restriction request signal containing a function restriction security code to the management apparatus 30 (step S22). If the cellular phone 4 has received a portable device designation number together with the function restriction code number, the restriction request signal transmitted to the management apparatus 30 contains the function restriction security code and the portable device designation code.

When receiving the restriction request signal, the management apparatus 30 specifies a corresponding vehicle 2 based on the function restriction security code contained in the restriction request signal (step S23). The management apparatus 30 transmits a function restriction signal containing a function restriction code to the security controller 10 provided in the specified vehicle 2 (step S24). If the restriction request signal received by the management apparatus 30 contains a portable device designation code, then the management apparatus 30 transmits a function restriction signal containing an ID code corresponding to the portable device designation code in addition to the function restriction code.

When receiving the function restriction signal from the management apparatus 30, the security controller 10 transmits the restriction completion signal to the management apparatus 30 (step S25). Further, the security controller 10 performs the function restriction processes (a) and (b) (step S26).

When receiving the restriction completion signal, the management apparatus 30 transmits the restriction completion signal to the cellular phone 4 (step S27). That is, the management apparatus 30 functions as a communication relay means for transmitting the restriction completion signal transmitted from the security controller 10 to the cellular phone 4.

When receiving the restriction completion signal, the cellular phone 4 notifies the user that the security controller 10 is in a function restriction state by means of noise, vibrations, or a message display.

The security control system 1 has the advantages described below.

(1) When receiving a restriction request signal from the mobile device (cellular phone 4) carried by a user, the management apparatus 30 transmits a function restriction signal to the security controller 10. When receiving the function restriction signal, the security controller 10 prohibits or restricts the driving of the door lock driver 22 or the engine controller 23. This means that the security controller 10 prohibits or restricts the security deactivation operation by any device when receiving the function restriction signal. Therefore, if the user's portable device 3 has been lost or stolen, a restriction request signal can be transmitted from a cellular phone 4 to prohibit or restrict the security deactivation operation by the security controller 10. Accordingly, even if the portable device 3 is lost or stolen, it is possible to promptly prohibit or restrict the portable device 3 from conducting security deactivation operations, and thus a high security level is ensured.

(2) Security deactivation operations involving the use of the portable device 3 are easily prohibited or restricted by the user. This substantially lowers the value of the portable device 3 if stolen by a third party. Therefore, such a portable device 3 would not be worthwhile stealing for any third party, and nobody would want to steal the portable device 3. Thus, the antitheft effect of the portable device 3 is also improved.

(3) If the user inputs a portable device designation number designating a portable device 3 when performing a restriction operation on a cellular phone 4, the security controller 10 prohibits or restricts only security deactivation involving communication with the designated portable device 3. In other words, when a restriction operation is performed with the cellular phone 4, security deactivation operations are prohibited or restricted for the specified portable device 3. Therefore, when a portable device 3 is lost or stolen, the user can prohibit or restrict the security deactivation operations performed by only that portable device 3, while allowing other registered portable devices 3 to perform normal security deactivation operations. In other words, portable devices 3 that are not lost or stolen can be used without any restrictions. Thus, security deactivation operations are not prohibited or restricted in portable devices 3 that required no function restriction. This ensures the convenience of the portable devices 3.

It should be apparent to those skilled in the art that the present invention may be embodied in many other specific forms without departing from the spirit or scope of the invention. Particularly, it should be understood that the present invention may be embodied in the following forms.

The security controller 10 may prohibit communication with the portable device 3 when receiving a function restriction signal that does not contain the ID code in a state in which the first function restriction process (security deactivation prohibition process) is set (the case of (a-1)). In this case, when a function restriction signal is provided to the vehicle control unit 13, communication between the security controller 10 and the portable device 3 is disabled in the security control mode. Since the portable device 3 and the vehicle control unit 13 do not communicate with each other, control of the door lock driver 22 and the engine controller 23 with the vehicle control unit 13 is prohibited. This ensures a high security level for the security devices. In addition, if a function restriction signal is received in this case, the security controller 10 does not transmit a request signal during the security control mode. Since the portable device 3 does not receive the request signal, the ID code signal is not transmitted. This prevents unnecessary communication between the portable device 3 and the security controller 10 and reduces power consumption of the portable device 3 and the security controller 10.

In the above embodiment, the management apparatus 30 transmits the function restriction signal to the security controller 10. Alternatively, for example, as shown by the broken lines in FIG. 1, the portable device 3 may include a portable device side communication unit 44 for communicating with the management apparatus 30, and the management apparatus 30 may include a portable device communication unit 34 for transmitting the function restriction signal to the portable device 3. In this case, when the portable device 3 communicates with the security controller 10 after receiving the function restriction signal, the portable device 3 transmits a transmission signal containing the function restriction code (ID code signal, lock command signal). When the security controller 10 receives the transmission signal containing the function restriction code, the security controller prohibits or restricts security deactivation operations. This would also prohibit or restrict security deactivation operations with the portable device 3. This ensures a high security level.

Further, when the portable device 3 receives the function restriction signal, the portable device 3 may disable transmission of the ID code signal and the lock command signal.

When receiving the function restriction signal, the security controller 10 may prohibit or restrict security deactivation operations based on communication with the portable device 3 and does not have to enter the ID registration mode. As a result, ID registration control is prohibited. This prohibits security deactivation operations with a portable device 3 that has undergone a new registration attempt. Accordingly, a third party is prevented from fraudulently registering an ID code. This ensures a high security level for security devices.

In the preferred embodiment, the security controller 10 transmits the restriction completion signal to the cellular phone 4 via the management apparatus 30 when the function restriction state is set. Alternatively, the security controller 10 may directly transmit the restriction completion signal to the cellular phone 4 through a telephone network or the like without using the management apparatus 30.

In the preferred embodiment, when the restriction completion signal is transmitted to the cellular phone 4 via the management apparatus 30 from the security controller 10, notification is sent to the cellular phone 4 indicating that the security controller 10 has been set in the function restriction state. Alternatively, the management apparatus 30 may send the restriction completion signal to the cellular phone 4 when the management apparatus 30 transmits the function restriction signal to the security controller 10. When transmitting the function restriction signal to the security controller 10, the management apparatus 30 determines that the security controller 10 has been set in the function restriction state and sends such notification to the cellular phone 4.

In the preferred embodiment, mutual authentication (pairing) may be performed between the vehicle control unit 13 and the security communication unit 14 in the security controller 10 for mutually determining whether these two units operate normally. The security controller 10 may be designed to approve the registration of the ID code of the portable device 3 only when it is determined that the two units operate normally, namely, when the mutual authentication is established. According to such arrangement, if the security communication unit 14 is wrongfully removed or broken, the mutual authentication will not be established, and hence the ID code cannot be registered in the security controller 10. Thus, fraudulent registration of an ID code can be prevented with higher reliability.

The portable device 3 may be provided with a GPS module. In such case, the position of the portable device 3 can be located by the management apparatus 30 when function restriction is performed, and notification is sent to the cellular phone 4 from the management apparatus 30. Therefore, even if a portable device 3 has been lost or stolen, the user is able to know the location of the portable device 3.

In the preferred embodiment, a restriction request signal is transmitted from the cellular phone 4 to the management apparatus 30. Instead, the user may use the vehicle 2 to conduct the restriction operation, so that a restriction request signal is transmitted from the security controller 10 to the management apparatus 30. This means that the function restriction for a device (e.g., the door lock driver 22 and the engine controller 23) may be performed by conducting the restriction operation with the use of the vehicle 2. According to this arrangement, mobile devices, such as the cellular phone 4, are not required for performing the function restriction.

In the preferred embodiment, a vehicle registration signal is transmitted from the security controller 10 to the management apparatus 30 when the vehicle registration control is implemented to set the vehicle 2 as a subject to be managed by the management apparatus 30. Instead, a vehicle registration signal may be transmitted to the management apparatus 30 from a registration device provided separately from the security controller 10 when such vehicle registration control is performed. For example, a personal computer may be used as the registration device so that a vehicle registration signal is transmitted from the personal computer to the management apparatus 30. In this case, vehicle registration information such as vehicle information and function restriction code number is input to the personal computer, and a vehicle registration signal containing the vehicle registration information is transmitted to the management apparatus 30 via a communication network such as the Internet. In this case, the security controller 10 (vehicle 2) is not always required for the vehicle registration, and hence the convenience of the vehicle registration is improved. Further, a password that is set by the user, the dealer, or the manufacturer of the portable device 3 may be assigned to the vehicle registration signal to prevent the vehicle from being fraudulently registered by a third party.

The procedure for registering a vehicle 2 in the management apparatus 30 (vehicle registration procedure) and the procedure for registering an ID code of a portable device 3 in the security controller 10 (ID registration procedure) may be performed not only by the user but also by the dealer, the manufacturer of the portable device 3, or any other person that the user can trust.

In the preferred embodiment, the communication between the security controller 10 and the management apparatus 30 is not limited to radio communication but may also be, for example, be via wire communication employing a public communication line. For example, a connector for connecting a telephone modular jack may be provided in the vehicle 2, so that communication is performed between the security controller 10 and the management apparatus 30 using a telephone line.

In the preferred embodiment, the mobile device is not limited to a cellular phone 4, but may be for example, a laptop personal computer, a Personal Digital Assistance (PDA), or a special communication device.

The vehicle security control system 1 of the above embodiments is provided with a function for automatically unlocking the door when the portable device 3 approaches the vehicle 2 (smart entry function) and with a function for starting the engine when the portable device 3 enters the passenger compartment of the vehicle 2 (smart ignition function). These functions are implemented by communication between the portable device 3 and the security controller 10. However, the vehicle security control system 1 may not be provided with such smart entry function or smart ignition function. For example, the portable device 3 may include a transponder and a mechanical key. The mechanical key communicates with the security controller 10 when arranged in the vehicle 2. The security controller 10 allows the mechanical key to be rotated if communication with the transponder is established. If the mechanical key is rotated, the security controller 10 controls the door lock driver 22 or the engine controller 23. In other words, the only requirement is that the security controller 10 implements security deactivation operations based on communication with the portable device 3.

Such communication between the portable device 3 and the security controller 10 is not essential. For example, the portable device 3 may transmit only a lock command signal and, hence, the security controller 10 may not have a transmitter circuit 11 and may not transmit a request signal. In other words, the security controller 10 does not always have to perform communication with the portable device 3 as long as the security controller 10 performs security deactivation operations based on a transmission signal containing an ID code transmitted from the portable device 3.

In the preferred embodiment, the management apparatus 30 manages the number of ID codes of portable devices 3 that can be registered in the security controller 10 provided in the vehicle 2 to be managed. However, the management apparatus 30 does not always have to manage such number of ID codes.

The management apparatus 30 does not necessarily have to manage the ID code of the portable device 3. In other words, the management apparatus 30 does not necessarily have to be configured to record ID codes in the memory 32a. This reduces the recording load on the memory 32a of the management apparatus 30. In addition, the transfer of the registration signal and the registration completion signal between the security controller 10 and the management apparatus 30 becomes unnecessary. This reduces the communication load on the security controller 10 and the management apparatus 30. In this case, however, the security controller 10 cannot perform control for prohibiting or restricting only security deactivation operations with a predetermined portable device 3 (control of (a-2) and (b-2)).

In this modification, the management apparatus 30 is configured so that when receiving a restriction request signal containing a portable device designation code, the management apparatus transmits the function restriction signal containing the portable device designation code. Further, a registration number associated with a portable device designation code may be added to the ID code recorded in the memory 13a of the security controller 10. In this case, the security controller 10 prohibits or restricts only security deactivation operations through communication with a predetermined portable device 3 based on the portable device designation code contained in the function restriction signal and the registration number recorded in the memory 13a.

In the preferred embodiment, whenever the security controller 10 is switched to the ID registration mode, the vehicle security control system 1 is capable of registering a portable device 3 irrespective of where the portable device 3 is. Instead, the vehicle security control system 1 may be modified, for example, such that a portable device 3 can be registered by the security controller 10 only when the portable device 3 is at a predetermined position (e.g., at home, an office, or the dealer) by connecting a GPS module to the security controller 10. According to such arrangement, fraudulent ID code registration by a third party is prevented with higher reliability, and the security level can be further improved. Such modification is not limited to the registration location of the portable device 3 and may also be applied to any location where vehicle registration can be performed to register the vehicle 2 as the management subject of the management apparatus 30.

In the preferred embodiment, the operation for switching the security controller 10 to the ID registration mode is not limited to the operation of the mode switch 21. For example, the security controller 10 may be modified to be switched to the ID registration mode by using an existing switch provided in the vehicle 2 (e.g., lever combination switch) in a predetermined mode (desirably, in a mode that is preset by and known only by the user or dealer). In this case, the mode switch 21 can be omitted. Also, the security controller 10 can be prevented from being switched unintentionally to the ID registration mode by an erroneous operation of the mode switch 21. In the same manner, the operation for entering the vehicle registration mode may also be modified.

The management apparatus 30 may be arranged not only in a special management center but also in a user's residence. In this case, the management apparatus 30 may be a personal computer or the like.

In the preferred embodiment, the cellular phone 4 may be designed to transmit a restriction request signal to the management apparatus 30 when receiving a predetermined voice command.

The communication between the cellular phone 4 and the management apparatus 30 may be implemented by conversation between the user and an operator working in the management center where the management apparatus 30 is located. Specifically, the user may call the management center by using the cellular phone 4 and provide a restriction request through conversation with the operator. In this case, the operator, as instructed by the user, operates the management apparatus 30 to conduct function restriction control. In this case, the cellular phone 4 is not required to transmit a restriction request signal to the management apparatus 30.

The security control system may control the security not only of the door lock driver 22 or the engine controller 23, but also the security of other vehicle devices such as a steering lock device, a shift lock device, or a wheel lock device. That is, the security control system may control the security of any device as long as the control of such equipment is effective for restricting or inhibiting the vehicle 2 from traveling normally.

The security control system is not limited to the vehicle security control system 1 for control of vehicle equipment but may be applied to a building security system for controlling the locking and unlocking of a building door.

The present examples and embodiments are to be considered as illustrative and not restrictive, and the invention is not to be limited to the details given herein, but may be modified within the scope and equivalence of the appended claims.

What is claimed is:

1. A system for controlling a security device provided with a security function, the system comprising:
   a portable device provided with a communication function and having a portable device ID code;
   a security controller including a recording unit for recording a controller ID code, wherein the security controller communicates with the portable device to determine whether the portable device ID code and the controller ID code match, and controls deactivation of the security function of the security device based on the determination result; and
   a management apparatus for transmitting a function restriction signal to at least one of the portable device and the security controller in response to a restriction request signal;

wherein the security controller prohibits or restricts control of the security device when receiving the function restriction signal or when communicating with the portable device that has received the function restriction signal; and wherein the security controller:

communicates with the portable device and records the portable device ID code in the recording unit as the controller ID code; and prohibits recording of the portable device ID code in the recording unit in order to prohibit control of the security device when receiving the function restriction signal or when communicating with the portable device that has received the function restriction signal.

2. The system according to claim 1, wherein the security controller prohibits communication with the portable device when receiving the function restriction signal.

3. The system according to claim 1, wherein:

the portable device transmits a transmission signal, containing a function restriction code, to the security controller when receiving the function restriction signal; and the security controller prohibits or restricts control of the security device in accordance with the function restriction code when receiving the transmission signal.

4. The system according to claim 1, wherein:

the restriction request signal is transmitted from a mobile device;

the management apparatus includes a communication unit for receiving the restriction request signal, and transmits the function restriction signal when the communication unit receives the restriction request signal.

5. The system according to claim 1, wherein the management apparatus:

communicates with a mobile device operated by a user; and transmits to the mobile device a notification signal indicating transmission of the function restriction signal when transmitting the function restriction signal to at least one of the portable device and the security controller.

6. The system according to claim 1, wherein the system is for use in a vehicle having a door and an engine, and the security device includes at least one of a door lock driver, for locking and unlocking a vehicle door, and an engine control unit, for controlling enablement of engine starting.

7. The system according to claim 1, wherein:

the restriction request signal contains a portable device designation code for designating a portable device;

the management apparatus transmits the function restriction signal containing the portable device ID code associated with the portable device destination code to the security controller; and the security controller prohibits or restricts deactivation of the security function of the security device in accordance with the portable ID code contained in the function restriction signal.

8. The system according to claim 7, wherein the security controller prohibits or restricts control of the security device when receiving the portable device ID code from the portable device corresponding to the portable device ID code contained in the function restriction code.

9. A security controller for use with a portable device, having a portable device ID code, and a management apparatus, for transmitting a function restriction signal, wherein the security controller controls a security device provided with a security function, the security controller comprising:

a portable device communication unit for communicating with the portable device;

a recording unit for recording a controller ID code corresponding to the portable device ID code;

a control unit for determining whether the portable device ID code matches the controller ID code and controlling the security device based on a determination result; and a security communication unit for communicating with the management apparatus;

wherein the control unit prohibits or restricts deactivation of the security function of the security device when the security communication unit receives the function restriction signal; and wherein the control unit:

communicates with the portable device and records the portable device ID code in the recording unit as the controller ID code; and prohibits recording of the portable device ID code in the recording unit in order to prohibit or restrict control of the security device when the security communication unit receives the function restriction signal.

10. The controller according to claim 9, wherein the control unit prohibits communication with the portable device when the security communication unit receives the function restriction signal.

11. The controller according to claim 9, wherein the control unit prohibits deactivation of the security function of the security device when at least one of the security communication unit and the control unit is not operating normally.

12. The system according to claim 1, the management apparatus comprising:

at least one of a management communication unit and a portable device communication unit, the management communication unit communicating with the security controller, and the portable device communication unit communicating with the portable device; and a management control unit for transmitting a function restriction signal when receiving a restriction request signal to at least one of the security controller and the portable device via the at least one of the management communication unit and the portable device communication unit, wherein the function restriction signal prohibits or restricts deactivation of a security function of a security device.

13. The system according to claim 12, wherein the management apparatus is used with a mobile device for transmitting the restriction request signal, the management apparatus further comprising:

a mobile device communication unit for receiving the restriction request signal from the mobile device and providing the restriction request signal to the management control unit.

14. A security control method for use with a portable device, having a portable device ID code, a security controller, having a controller ID code, and a management apparatus, for communicating with the security controller, wherein the security controller determines whether the portable device ID code matches the controller ID code and controls deactivation of a security function of a security device based on the determination result, the method comprising:

transmitting a restriction request signal for function restriction to the management apparatus;

transmitting a function restriction signal with the management apparatus to at least one of the portable device and the security controller in response to the restriction request signal;

communicating with the portable device and recording the portable device ID code in the recording unit as the controller ID code; and prohibiting recording of the portable device ID code in the recording unit in order to prohibit control of the security device when receiving the function restriction signal or when communicating with the portable device that has received the function restriction signal.

15. The method according to claim 14, wherein said transmitting a restriction request signal includes transmitting the restriction request signal from a mobile device, held by a user, to the management apparatus when the user operates the mobile device.

* * * * *